(12) United States Patent
Herbst

(10) Patent No.: US 12,705,767 B2
(45) Date of Patent: Aug. 11, 2026

(54) METHOD FOR ASCERTAINING SUITABLE POSITIONING OF MEASURING DEVICES AND SIMPLIFIED MOVING IN MEASURING AREAS USING VIS DATA AND REFERENCE TRAJECTORIES BACKGROUND

(71) Applicant: LEICA GEOSYSTEMS AG, Heerbrugg (CH)

(72) Inventor: Christoph Herbst, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 580 days.

(21) Appl. No.: 18/102,364

(22) Filed: Jan. 27, 2023

(65) Prior Publication Data

US 2023/0237681 A1 Jul. 27, 2023

(30) Foreign Application Priority Data

Jan. 27, 2022 (EP) .................................... 22153735

(51) Int. Cl.
*G06T 7/33* (2017.01)
*G06T 7/246* (2017.01)
*G06T 7/73* (2017.01)

(52) U.S. Cl.
CPC ............. *G06T 7/337* (2017.01); *G06T 7/248* (2017.01); *G06T 7/74* (2017.01); *G06T 2207/10028* (2013.01); *G06T 2207/20081* (2013.01); *G06T 2207/20084* (2013.01); *G06T 2207/30168* (2013.01)

(58) Field of Classification Search
CPC ........... G06T 7/337; G06T 7/248; G06T 7/74; G06T 2207/10028; G06T 2207/20081;
(Continued)

(56) References Cited

U.S. PATENT DOCUMENTS

| | | | |
|---|---|---|---|
| 9,683,837 | B2 | 6/2017 | Siercks |
| 10,041,793 | B2 | 8/2018 | Metzler et al. |

(Continued)

FOREIGN PATENT DOCUMENTS

| | | |
|---|---|---|
| CN | 102947670 A | 2/2013 |
| CN | 105606077 A | 5/2016 |

(Continued)

OTHER PUBLICATIONS

European Search Report dated Jul. 22, 2022 as received in application No. 22153735.0.

*Primary Examiner* — Aditya S Bhat
(74) *Attorney, Agent, or Firm* — Maschoff Brennan

(57) ABSTRACT

A method for ascertaining a suitable deployment of a mobile measuring device within measurement surroundings, wherein first and second measurement surroundings containing first and second object features are automatically optically captured at the first deployment and tracked using a visual inertial system (VIS) and within the scope of changing the deployment. The first and second measurement surroundings are compared, wherein the comparison is based on searching for corresponding first and second object features visible in a certain number and quality in the first and second measurement surroundings, wherein this certain number and quality of corresponding features is a criterion that a registration of the first and second point cloud is possible.

16 Claims, 8 Drawing Sheets

(58) Field of Classification Search
CPC . G06T 2207/20084; G06T 2207/30168; G06T 7/521; G06T 7/55; G06T 7/593; G06T 7/75; G06T 17/05; G06T 2207/10012; G06T 2207/10021; G06T 2207/10032; G06T 2207/30181; G06T 2207/30184; G01C 1/04; G01C 15/00; G01C 1/00; G01C 3/00; G01C 3/08; G01C 11/025; G01C 11/06; G01S 17/66; G01S 17/89; G01S 7/4817; G01S 17/42; G01S 17/86; B64C 39/02; B64C 39/024; G02B 23/00; G05D 1/00; G05D 1/0094
USPC .......................................................... 702/152
See application file for complete search history.

(56) References Cited

U.S. PATENT DOCUMENTS 10,060,739 B2 8/2018 Metzler et al.
10,337,865 B2 7/2019 Green et al.
2014/0043436 A1* 2/2014 Bell .................... G06V 20/653 348/46
2015/0160342 A1 6/2015 Zweige et al.
2015/0160343 A1 6/2015 Zweigle et al.
2018/0356222 A1 12/2018 Metzler et al.
2020/0249017 A1 8/2020 Torok et al.
2020/0363202 A1 11/2020 Metzler et al.
2025/0283995 A1* 9/2025 Steinberg ................ G01S 13/88

FOREIGN PATENT DOCUMENTS

CN 105716590 A 6/2016
EP 1686350 A1 8/2006
EP 1903303 B1 3/2008
EP 3062066 A1 8/2016
EP 3086283 A1 10/2016
EP 3333538 A1 6/2018
EP 3415866 A1 12/2018
JP 2017211265 A 11/2017

* cited by examiner

METHOD FOR ASCERTAINING SUITABLE POSITIONING OF MEASURING DEVICES AND SIMPLIFIED MOVING IN MEASURING AREAS USING VIS DATA AND REFERENCE TRAJECTORIES BACKGROUND

CROSS-REFERENCE TO RELATED APPLICATIONS

This application claims the benefit of European Patent Application No. 22153735.0 filed Jan. 27, 2022.

BACKGROUND

The present disclosure relates to a method for ascertaining a suitable deployment of a mobile measuring device within measurement surroundings, wherein first and second measurement surroundings containing first and second object features are automatically optically captured at the first deployment and tracked using a visual inertial system (VIS) and within the scope of changing the deployment. The first and second measurement surroundings are compared, wherein the comparison is based on searching for corresponding first and second object features visible in a certain number and quality in the first and second measurement surroundings, wherein this certain number and quality of corresponding features is a criterion that a registration of the first and second point cloud is possible.

A multiplicity of measurement methods for recording properties of defined points in measurement surroundings, in particular data with a spatial relationship, have been known since antiquity. In the process, the position and alignment of a surveying device and direction, distance and angle to measurement points are recorded as spatial standard data. A theodolite or a total station, provided for highly accurate individual point measurements, represent generally known examples of such coordinate-type surveying devices or geodesic devices. By way of example, a geodesic surveying device of the prior art is described in EP 1 686 350. Another type of generic terrestrial coordinate measuring device relates to scanning devices such as laser scanners, which are embodied to record a very large number of object points in order thus to three-dimensionally map, e.g., building or workpiece surfaces in the form of point clouds. Modern devices can have a camera, which is aligned in a targeted direction and/or able to pan, for capturing an image, the captured image being able to be displayed, in particular, as a live image on the display of the display-control unit and/or on a display of a connected peripheral device such as a tablet, for example.

In principle, such station coordinates, and also the alignment of the measuring device at the location, can be calculated as a so-called free deployment from measurements in relation to points in the measurement surroundings that have already been referenced absolutely. The prior art has disclosed a multiplicity of methods that facilitate a referencing of the respective device position for a deployment. Additionally, methods are known, by means of which a plurality of measurement regions of measurement surroundings from different deployments can subsequently be related to one another or related to one and the same reference system, for example within post processing as a so-called registration of 3D point clouds.

Often, measurement surroundings cannot be surveyed in the entirety thereof from a single deployment, for example because one or more sides of an object face away from the device, because these are angled measurement surroundings (e.g., a plurality of rooms in a building) or because objects are partially shadowed by other objects. Therefore, a single deployment usually does not suffice; instead, the device must survey the measurement surroundings from a plurality of positions. Here, all relevant measurement surrounding regions or all required object points should be surveyed; i.e., gap-free surveying should be implemented. A user often finds it difficult, or requires much time, to decide which positions are suitable for deployment or—particularly if a very large number of deployments is required—to find an optimal measuring path (as a successive progression of surveying locations) which avoids unnecessary deployments or repeated surveying without, on the other hand, "missing" regions in the surroundings.

EP 1 903 303 B1 proposes a method for filling surveying gaps, including capturing principal point cloud data from a specified measurement region by a laser scanner, identifying a region without captured data, capturing complementary image data of the region without captured data from at least two directions by an additional image recording apparatus, preparing a stereoscopic image on the basis of the complemented image data obtained by the additional image recording apparatus, capturing complementary point cloud data from the region without captured data by way of an image measurement on the basis of the stereoscopic image, complementing the region of the principal point cloud data without captured data by comparing the principal point cloud data with the complementing point cloud data. Here, the method is provided for post processing. Consequently, in-situ information or advance information about non-captured regions is not available.

The typical registration of laser scans, i.e. the combination of the individual scans to one combined point cloud, is performed after the complete data acquisition in the office using post-processing software. When in the office, it is usually the first time when an operator is able to investigate the result of the scanning project and check the completeness of the data acquisition. It is possible that the operator identifies some missing areas and they may have to go back to the site and perform some additional scans. Sometimes, in cases where the project location is far from the office, it can be associated with a drive of quite some time and, therefore, something customers want to avoid at all costs.

If it turns out during the post processing that the scans cannot be registered due to insufficient overlap areas or other reasons, there is no immediate possibility of rectification, since, as mentioned, this evaluation is not performed in the field.

Performing simple measurements of the object is usually only feasible on the PC after the scan has been registered. However, this is disadvantageous for some applications, such as when the data sets created during the survey are secret and must not leave the facility. This means that all decisions, evaluations and data acquisition have to be carried out on site, so that the subsequent measurement of the object is inadmissible in the post-processing described above.

In-field pre-registration of several laser scans solves costly rework completely. After each scan, the acquired data in the field are automatically registered with the previous scan data acquired. The resulting combined point cloud is visualised on a mobile tablet computer. This allows the user to immediately investigate what data is captured and what data could be missing, to optimally plan the next scanner setup and, above all, to perform a completeness check when still on site.

EP 3 062 066 A1 discloses a method that can be used to provide in-situ measurement positions, or measurement positions suitable in advance, of a surveying unmanned aerial vehicle (UAV). To this end, reference points of an object are ascertained by means of a terrestrial surveying device such as a total station or a laser scanner, on the basis of which measurement positions for the UAV to be adopted for the purposes of actually surveying the object by means of the UAV can be derived. Thus, a suitable surveying flight path for a surveying UAV can be ascertained in advance using this quite specific and complicated method. However, this teaching is no help for improved surveying from a plurality of locations or for finding improved deployments by means of a mobile measuring device such as a laser scanner or a total station itself.

SUMMARY

It is therefore an object of the present disclosure to provide a method for ascertaining a suitable deployment of a mobile measuring device within measurement surroundings, which eliminates deficiencies of the prior art.

It is a further object of the disclosure to provide a computer program product for carrying out the mentioned method.

It is also an object of the disclosure to provide a mobile measuring device which is used for the mentioned method.

The disclosure relates to a method for ascertaining a suitable deployment of a mobile measuring device within measurement surroundings, wherein a first measurement region is surveyed from a first deployment. Based on this survey, the number of measuring points in the first measurement region is determined as the first point cloud and the first measurement surroundings containing first object features are automatically optically captured at the first deployment and tracked using a Visual Inertial System (VIS).

The mobile measuring device is moved away from the first deployment for the purposes of changing the deployment to a second deployment and survey a second measurement region from this second deployment, wherein based on this second survey, the number of measuring points in the second measurement region is determined as a second point cloud. The second measurement surroundings containing second object features are automatically optically captured and tracked using the VIS within the scope of changing the deployment and the first and second measurement surroundings are compared, wherein the comparison is based on searching for corresponding first and second object features visible in a certain number and quality in the first and second measurement surroundings, wherein this certain number and quality of corresponding features is a criterion that a registration of the first and second point cloud is possible.

The method described here for ascertaining a suitable deployment of a mobile measuring device within measurement surroundings is described as an example for a first and a second deployment. It can be used for any number of deployments and is not limited to a first and second deployment. For example, after measurements of four deployments have been performed, the method can be used for ascertaining a suitable fifth deployment.

The comparison of the first and second measurement surroundings is already carried out during deployment change, wherein the user is informed about the result of the comparison during the deployment change. The user is informed as there is a point cloud registration of the first and the second point cloud possible, and/or there is a point cloud registration of the first and the second point cloud impossible.

In a further (developed) embodiment, the user is informed about the result of the comparison during the deployment change. The user is informed as there are still first and second object features visible in a certain number and quality in the first and second measurement surroundings, and/or there are no longer first and second object features visible in a certain number and quality in the first and second measurement surroundings.

The VIS is detecting object features/point features, or so-called landmarks, in the image stream and tracks their position from one image frame to the next. Now, when the camera moves towards a building, the detected features, e.g. the corners of the building, or the door or the windows, will then move from the image centre outwards since the building is getting larger in the field of view. When the camera is rotating from left to right the features on the image would then move to the right and to the left If there is a VIS system with several cameras, the features can also move from one camera field of view to the field of view of another camera during rotation. Hence, from the movement of the object features between the frames of the image stream or the appearance of the features in different camera fields of view, VIS can deduce the direction of motion of the camera in 3D-space.

In a continuous process, an algorithm computes the 3D-coordinates (mapping) of the tracked features from two or more positions and uses these coordinates for the determination of the following position (localisation). The generated map of landmarks is evolving as the operator moves along this track to the next scanner setup and acts as a reference for the whole positioning algorithm. Consequently, this map that is built up and maintained during the process is essential to keep the drift error small.

The VIS provides the track of the movement together with the number and quality of the object features detected by the VIS. VIS is therefore expanded to a full dome system. During movement, for example five cameras and an Inertial Measurement Unit (IMU), wherein an IMU is not obligatory but optional, are activated for Visual-Inertial Localization, i.e. to compute the six degrees of freedom of the pose transformation from the previous and next scan station. The purpose of the VIS is to determine the relative position and orientation between two consecutive scanner setups. The six degrees of freedom are computed automatically, without the need of any user interaction. Based on the relative positioning, the second point cloud can be transformed in the coordinate system of the first. This initial pre-alignment is highly valuable for a preliminary user check and an automatic adjustment with ICP (Iterative Closest Point) algorithms. The delta-poses of consecutive scan stations are stored as metadata for every job. The working principle of VIS is the Visual SLAM (Simultaneous Location And Mapping). It may combine visual information from one or more (preferably five) cameras with inertial measurements from an optional IMU, yielding a highly robust and accurate pose estimation system.

Once the scan has been collected at the first setup, the VIS algorithm identifies visual features on the first set of images streamed from the one or more (five) cameras. These points, thanks to the relative calibration of the 3D engine and the VIS cameras, are available as 3D points. The back intersection of this first set of 3D points in the VIS streaming gives the computed position of the scanner as starting point of the VIS tracking.

It is also thinkable to combine the optically captured data by the VIS with other sensors on the device, mainly with compass, optional with a Global Navigation Satellite System (GNSS) or LIDAR SLAM. If such other sensors like IMU or GNNS are present, the VIS initialization can be also done during movement or deployment change, because the movement of the features can be correlated with the movement of the sensors.

The VIS technology does not add any constraints on the laser scanning workflow, which means that the operator is not affected by some additional rules like carrying the laser scanner in a specific manner. Even if one side of the device is obstructed, e.g. by the body of the operator, the VIS technology still works. Fundamentally, this is the main reason for more than one VIS camera built into the device. Moreover, the processing of the automatic pre-registration is carried out in real-time in such a way that the operator gets the result presented immediately after the scan was performed.

For registration a point cloud overlap is required. This requirement is met if a certain number and quality of the object features is visible in the optically captured first measurement surroundings as well as in the optically captured second measurement surroundings.

In a further embodiment, a position of the mobile measuring device adopted within the scope of the movement is checked for the suitability thereof for a deployment, in particular for a second and next deployment, based on an automatic analysis of the possibility of the point cloud registration of the first and the second point cloud.

Preferably, such a check is implemented in view of a suitability for a second and next deployment, i.e., following or as a direct successor of the first deployment. Consequently, the automatic "live" check of position can ensure that successively adjoining measurement regions of the measurement surroundings are surveyed without measuring gaps arising therebetween.

In a further embodiment, a processing is implemented continuously, wherein in the scope of the processing the optical capture of the first and second measurement surroundings containing first and second object features is implemented continuously, and/or the captured first and second object features are updated continuously on the basis of the continuously captured first and second measurement surroundings. The comparison of first and second measurement surroundings, and/or the comparison of captured first and second object features, and/or the automatic analysis of the possibility of the point cloud registration of the first and the second point cloud, and/or the check for the suitability for a deployment are implemented continuously.

In a further embodiment, a user warning is output within the scope of the method as soon as a position is determined as being unsuitable for a deployment. In this case, the next possible step may include ascertaining a suitable position for an optimal deployment is further implemented on the basis of at least one specified optimization criterion.

In a further embodiment, within the scope of the method and on the basis of a result of the check,

- a suitable and/or unsuitable location, and/or location zone for surveying the second measurement region, and/or
- a visibility of the first and second object features in a certain number and quality in the first and second measurement surroundings, and/or
- existing of coverage gaps in the first and second point cloud, are established and provided as user output, in particular by means of an acoustic, and/or vibrational, and/or optical signal, in particular a visualization on a graphical map of the measurement surroundings.

An IMU provides measurements for accelerations and angular rates that are integrated to derive velocity in a first step and finally position and orientation of the device. Since these measurements are affected by measurement errors, the integration leads to a significant drift of the derived quantities. Since in this approach a map as an overall reference is missing, the resulting drift is significantly higher compared to VIS. Although, an optimal result cannot be achieved based on IMU only, so the data from the IMU can be fused with the image measurements and support VIS.

By analyzing the point cloud data on-the-fly (preferably down-sampled) possible gaps caused by occlusion could be detected. In consequence, possible point cloud gaps could be brought to the user's attention and the user can be guided to an optimal position to close the gap(s).

The last location where registration with the previous scan is possible is marked on the track. Hence, the user can be notified and guided back to that spot.

In a further embodiment, ascertaining a suitable position for an optimal deployment is further implemented on the basis of at least one specified optimization criterion.

In a further embodiment, the optimization criterion relates to

- a gap-free joining of the second measurement region to the first measurement region with a defined overlap with said first measurement region, and/or
- surveying the first measurement region and the second measurement region with
  - as few deployments as possible, and/or
  - as little time expenditure as possible, and/or
  - the shortest possible path between the deployments, and/or
  - the greatest possible geometric accuracy of the deployments with respect to one another, and/or
  - as equidistant deployments as possible,
- first and second point clouds with point density as homogeneous as possible.

Thus, with this concept the number of scan positions needed for registration can be minimized. The provided information allows the user to select a good spot for the scan and reduce the number of necessary scan positions. Navigation in the field is also supported.

In a further embodiment, the data

- of the optical capture of the first and second measurement surroundings,
- of the comparison of the optical captured first and second measurement surroundings,
- of the first and second point cloud,
- of the analysis of the first and second point cloud,
- of the check for the deployment suitability,
- of suitable and/or unsuitable locations and/or location zones for surveying the measurement regions, are uploaded to a cloud in real time and are downloadable from the cloud at any time after their upload.

In a further embodiment, data of reference trajectories which are derived from previous scanning campaigns and/or which are precalculated are downloaded from the cloud and/or are already saved on the mobile measuring device, wherein the user and/or the mobile measuring device selects (the mobile measuring device is able to independently/automatically select at least one reference trajectory which it considers suitable for fulfilling as many of the optimization criteria already mentioned as possible) at least one of the reference trajectories, wherein the selected reference trajectory is compared with the movement of the mobile measuring device, wherein said comparison assists the user navigating through the measurement surroundings by providing the user a user output, in particular by means of an acoustic signal, and/or a vibrational signal, and/or an optical signal, in particular a visualization on a graphical map of the measurement surroundings when the user leaves the reference trajectory.

Starting from a known position on site, the system can compare its current movement with a reference trajectory. This reference can be derived from a previous scanning campaign or precalculated in the office or cloud and sent to the device. Based on the differences of both tracks navigation is possible.

In a further embodiment, the data are uploaded to and downloaded from the cloud simultaneously from multiple mobile measuring devices, wherein these multiple measuring devices are used and coordinated for the surveying of the measurement surroundings (and thus a time saving is achieved for the surveying process).

The operator can be guided inside and outside a building. This allows the usage of different devices and device types on site. Realtime data processing in a cloud can calculate a new scan position and send guidance data directly to the device.

In a further embodiment, the distance between the deployments and/or the distances between the mobile measuring device and the measured object features in the measurement surroundings and/or the distances between measured object features in the measurement surroundings are determined by machine learning, in particular by a convolutional neural network, wherein the distances between the mobile measuring device and the measured object features in the measurement surroundings and/or the distances between measured object features in the measurement surroundings are a criterion that a point cloud registration of the first and the second point cloud is possible, in particular that large distances between the mobile measuring device and the measured object features and/or large distances between measured object features indicate coverage gaps in the first and second point cloud.

By use of the VIS the distance between the scanning positions as well as the distance to the measured objects (e.g. by use of the VIS' initial features) can be tracked. Guiding the user to almost equidistant positions with simultaneously controlled object distances can result in registered point clouds with homogeneous point density and an optimized number of scan positions.

In a further embodiment, the number and quality of corresponding first and second object features is used to optimize the deployment, wherein

- an increased number of corresponding object features facilitates the registration of the first and second point clouds via a feature-based method for coarse registration,
- the coarse registration provides sufficiently accurate initial values for fine registration by means of an algorithm, in particular an iterative closest point algorithm (ICP),
- the quality of the optical capture of corresponding first and second object features is determined by counting and matching pixels in the images of the first and second measurement environments that correspond to first and second object features, wherein a high match in the number of pixels corresponds to a high quality of the optical capture of corresponding first and second object features,
- with an increased quality of corresponding first and second object features, a fine registration by means of an algorithm, in particular an iterative closest point algorithm (ICP), is facilitated.

The disclosure also relates to a computer program product having program code stored on a machine-readable medium, in particular on an electronic data processing unit, configured as a control and evaluation unit, of the mobile measuring device, for carrying out at least the following steps of the described method.

These steps include optically capturing at the first deployment and tracking of the first measurement surroundings containing first object features using the VIS, determining the number of measuring points in the first measurement region as the first point cloud and surveying a second measurement region from a second deployment, wherein based on this second survey the number of measuring points in the second measurement region is determined as a second point cloud. Further steps are an optically capturing and tracking of second measurement surroundings containing second object features using the VIS within the scope of changing the deployment of the mobile measuring device, comparison of the first and the second measurement surroundings, wherein the comparison is based on searching for corresponding first and second object features visible in a certain number and quality in the first and second measurement surroundings, wherein this certain number and quality of corresponding features is a criterion that a registration of the first and second point cloud is possible, and carrying out the comparison of the first and second measurement surroundings during deployment change. The user is informed about the result of the comparison during the deployment change, wherein the user is informed as there is a point cloud registration of the first and the second point cloud possible, and/or there is a point cloud registration of the first and the second point cloud impossible.

The disclosure also relates to a mobile measuring device comprising one or more optical units embodied as VIS to capture measurement surroundings containing object features and a deployment checking functionality.

When carrying out the deployment checking functionality an optically capturing at the first deployment and tracking of first measurement surroundings containing first object features by means of the one or more optical units using a VIS, a determining of the number of measuring points in the first measurement region as the first point cloud and a surveying of a second measurement region from a second deployment, wherein based on this second survey the number of measuring points in the second measurement region is determined as a second point cloud, are included steps.

Further steps of the deployment checking functionality are an optically capturing and tracking of second measurement surroundings containing second object features using a VIS within the scope of changing the deployment of the mobile measuring device, a comparison of the first and the second measurement surroundings, wherein the comparison is based on searching for corresponding first and second object features visible in a certain number and quality in the first and second measurement surroundings, wherein this certain number and quality of corresponding features is a criterion that a registration of the first and second point cloud is possible, a carrying out of the comparison of the first and second measurement surroundings during deployment change, The user is informed about the result of the comparison during deployment change, wherein the user is informed as there is a point cloud registration of the first and the second point cloud possible, and/or there is a point cloud registration of the first and the second point cloud impossible.

The basic concepts of navigation and gap detection can also be used for autonomous scanning devices or mobile mapping. Lidar Slam could be used in addition to VIS.

DETAILED DESCRIPTION

Figure 1:
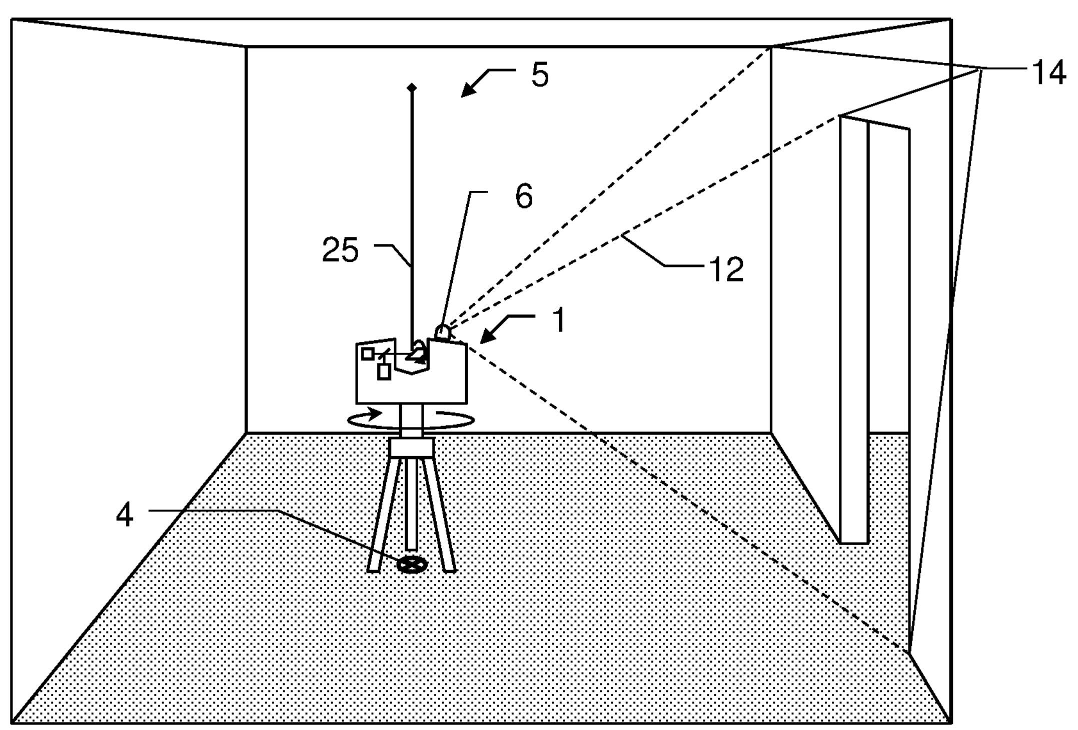
FIG. 1: embodiment of the mobile measuring device configured as a laser scanner during the survey of an indoor environment from a first deployment.

FIG. 1 depicts an exemplary embodiment of the mobile measuring device 1, embodied as a laser scanner in the example, during the survey 25 of an indoor environment from a first deployment 4. Besides the survey 25 first measurement surroundings 5 containing first object features 14 are automatically optically captured 12 and tracked using a visual inertial system (VIS) 6. Such object features may be distinctive, recognizable features such as corners, edges, etc.

The embodiment of the mobile measuring device 1, shown here as laser scanner, is purely exemplary and possible modifications are known from the prior art. A total station or an electronic tachymeter, with which individual point measurements are performable, e.g., within the scope of geodetic surveying, are further examples of such a device.

By means of the rotation of the beam steering unit, the surfaces of the measurement surroundings 3 are scanned by the measuring beam along a vertical circumference. By means of the rotation of the upper part relative to the base, these circumferences successively scan the entire room. The totality of the measurement points of such a measurement is referred to as the scan 25 and may yield a point cloud, for example.

The surveying of the surroundings 3 by means of the mobile measuring device 1 in each case creates a scan of a certain recording object or, phrased more generally, object points are measured in coordinative fashion. Here, there often are recording objects or measurement surroundings 3 that cannot be captured by a single scan or from a single location 4, for example angled interiors or a plurality of rooms of a building. For the surveying thereof, a user is assisted by the method, as described on the basis of the following figures, by virtue of positions being automatically checked for the suitability thereof for a deployment.

Figure 2:
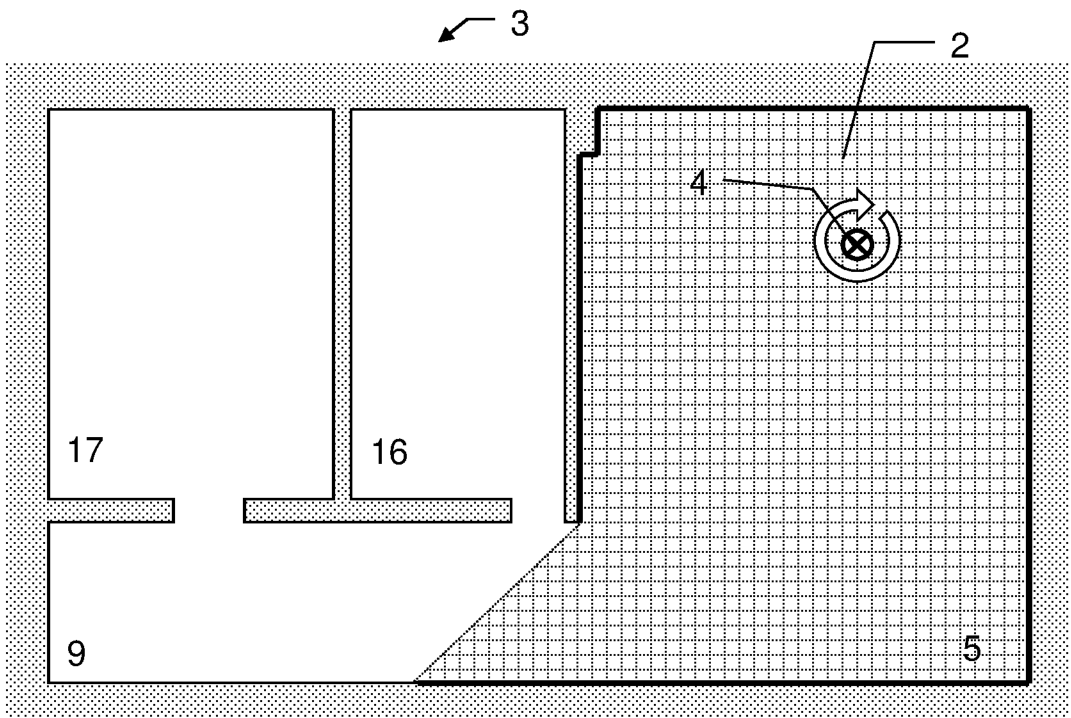
FIG. 2: visualization of the first measurement region covered by the first measurement position on a floor plan.

FIG. 2 depicts a visualization of the first measurement region 2 covered by the first measurement position 4 on a floor plan of the measurement surroundings 3. The laser scanner is set up at a first measurement position 4 in one of the rooms. The surfaces, i.e., walls, floor and ceiling (indicated in the figure by the thick black lines), of the first measurement surroundings 5 (first part of the measurement surroundings 3) are successively scanned as first measurement region 2 (grey hatched area), wherein a first point cloud may arise as a result.

Figure 3:
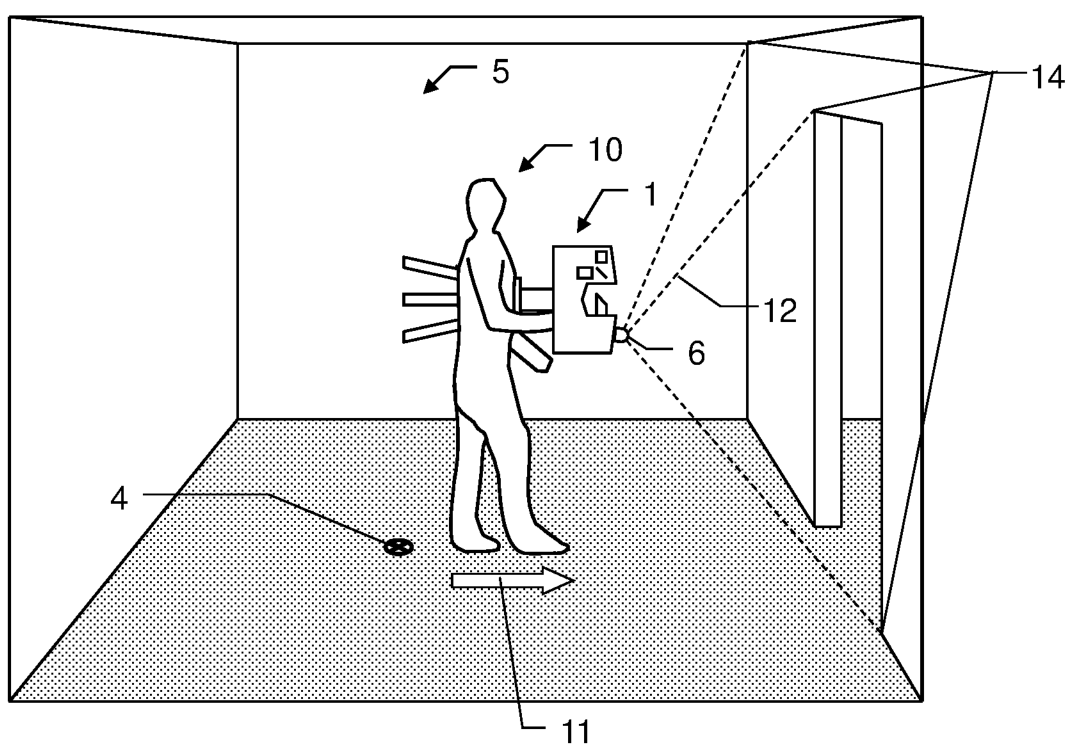
FIG. 3: visualization of the optical capture of the first measurement surroundings and the first object features which are contained therein by means of the VIS.

FIG. 3 depicts a visualization of the optical capture 12 of the first measurement surroundings 5 and the first object features 14 which are contained therein by means of the VIS 6 during the deployment change 11. The user 10 carries the device 1 in order to be able to measure the missing parts of the measurement surroundings 3 in addition to the first measurement surroundings 5. During the deployment change 11, the object features 14 are also optically detected by the VIS 6. In this figure, a corner of the room and two corners of the corridor were detected as object features 14. Other features are also conceivable that can be clearly identified and are suitable for distinguishing for example the corridor from the rest of the wall.

Figure 4:
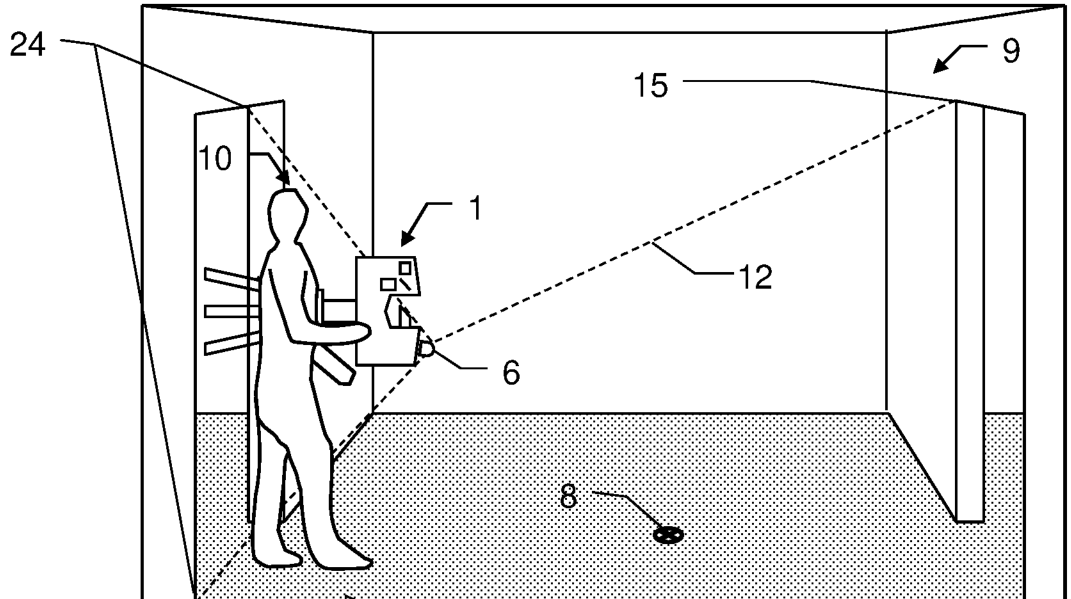
FIG. 4: visualization of the optical capture of the second measurement surroundings and the second object features which are contained therein by means of the VIS.

FIG. 4 depicts a visualization of the optical capture 12 of the second measurement surroundings 9 and the second object features 15 which are contained therein by means of the VIS 6 during the deployment change 11. The user 10 enters the second measurement surroundings 9 still carrying the device 1. The second object features 15 are also optically captured 12 by the VIS 6. Then the captured object features 14, 15 are searched for corresponding first and second object features 24 (here shown as two corners of the corridor). If corresponding first and second object features 24 (a subset of the object features 14) are visible in a certain number and quality (the expression "certain" does not mean that there has to be exactly this number of object features, but that there has to be a minimum number of object features) in the first and second measurement surroundings, wherein this certain number and quality of corresponding features 24 is a criterion that a registration of the first and second point cloud is possible, the user 10 is informed during the deployment change 11 as there is a point cloud registration of the first and the second point cloud possible or impossible. The position of the device 1 adopted within the scope of the movement 11 is checked for the suitability thereof for a deployment, in particular for a second 8 and next deployment 13, based on an automatic analysis of the possibility of the point cloud registration of the first and the second point cloud. Within the scope of this automatic analysis, an increased number of corresponding object features 24 facilitates the registration of the first and second point clouds via a feature-based method for coarse registration.

The coarse registration does not necessarily have to be feature based, because the VIS always provides a displacement vector and continuously the position starting from a starting point. Consequently, a rough alignment can always be made. However, accurate registration is only possible if there is a point cloud overlap wherefore the corresponding features 24 are important.

This coarse registration provides sufficiently accurate initial values for fine registration by means of an algorithm, in particular an iterative closest point algorithm (ICP). The quality of the optical capture 12 of corresponding first and second object features 24 is determined by counting and matching pixels in the images of the first and second measurement environments 5, 9 that correspond to first and second object features, wherein a high match in the number of pixels corresponds to a high quality of the optical capture 12 of corresponding first and second object features 24. If a high quality of corresponding first and second object features 24 is registered, a fine registration by means of an algorithm, in particular an iterative closest point algorithm (ICP), is carried out with the point cloud data.

Figure 5:
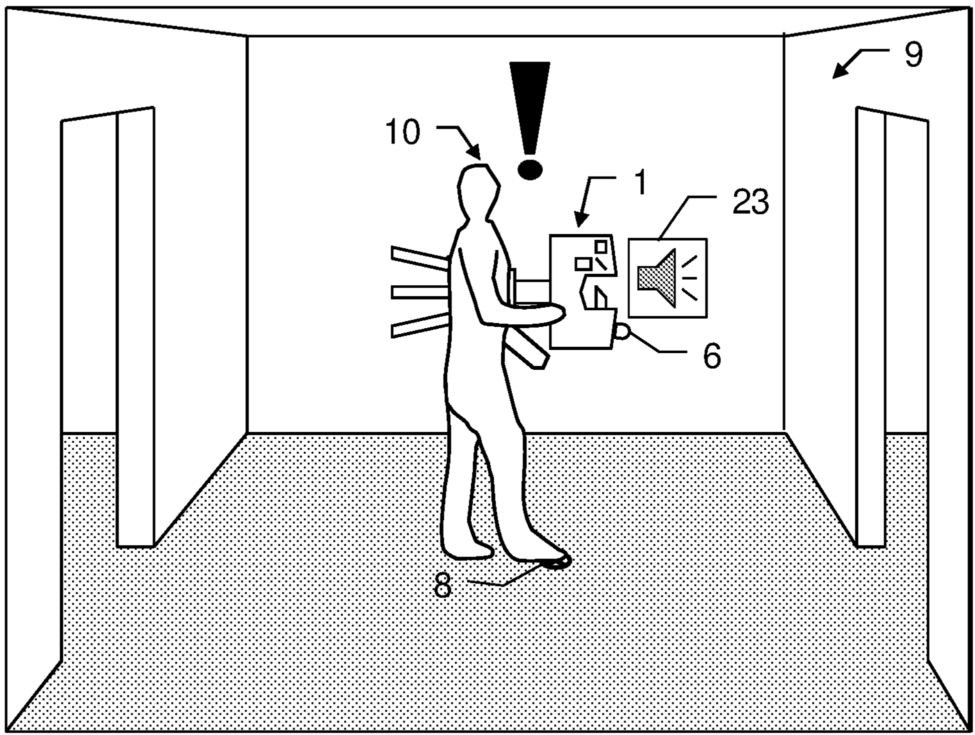
FIG. 5: visualization of the user output when reaching or leaving a suitable location for further measurements.

FIG. 5 depicts a visualization of the user output 23 when reaching or leaving a suitable location for survey the second measurement surroundings 9. At this location a point cloud registration of the first and the second point cloud is possible. The suitable location for surveying the second measurement region 7 without a gap to the first measurement region 2 is established and provided as an acoustic signal. However, it can also be the case that the number of corresponding features 24 becomes critically low. The user is thus warned before leaving an overlap area. Since the path 11 is continuously recorded, the user can also be guided back if he has left the area in which registration is possible.

Figure 6:
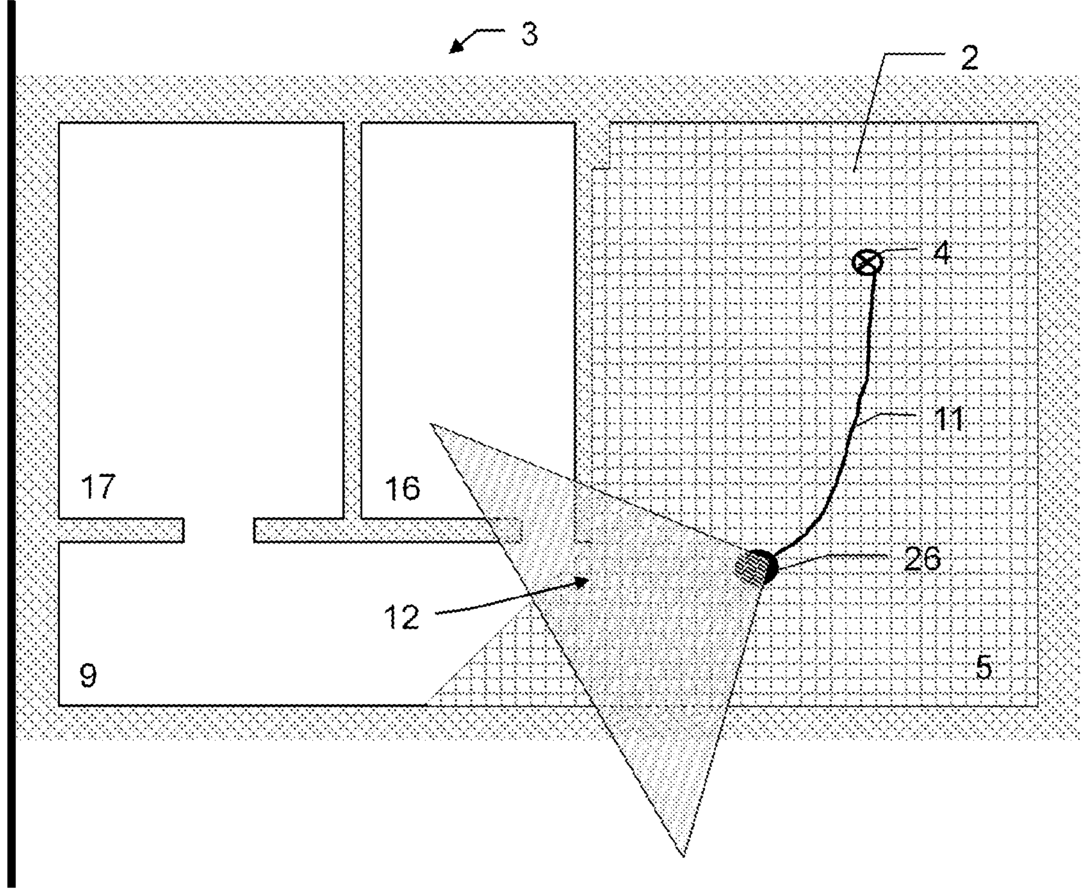
FIG. 6: visualization of the optical capture during the deployment change on a floor plan.

FIG. 6 depicts a visualization of the optical capture 12 during the deployment change 11 on a floor plan. The laser scanner is moved along the path 11 from the first deployment (measurement position) 4 to the position 26 for the purposes of changing the deployment. Here, for example within the scope of a deployment ascertainment functionality of the laser scanner, measurement surroundings 3 are optically captured 12 from the position 26, in the example via VIS. For a simpler illustration, measurement surroundings 3 are captured only at the position 26 in this example; however, within the scope of the method, measurement surroundings are captured continuously along the path 11 within the scope of changing the deployment, starting from the measurement position 4. The analysis of the possibility of the point cloud registration of the first and the second point cloud is preferably carried out continuously such that a multiplicity of positions are checked for the suitability thereof for a deployment or the respective current position is continuously monitored for a suitability.

Figure 7:
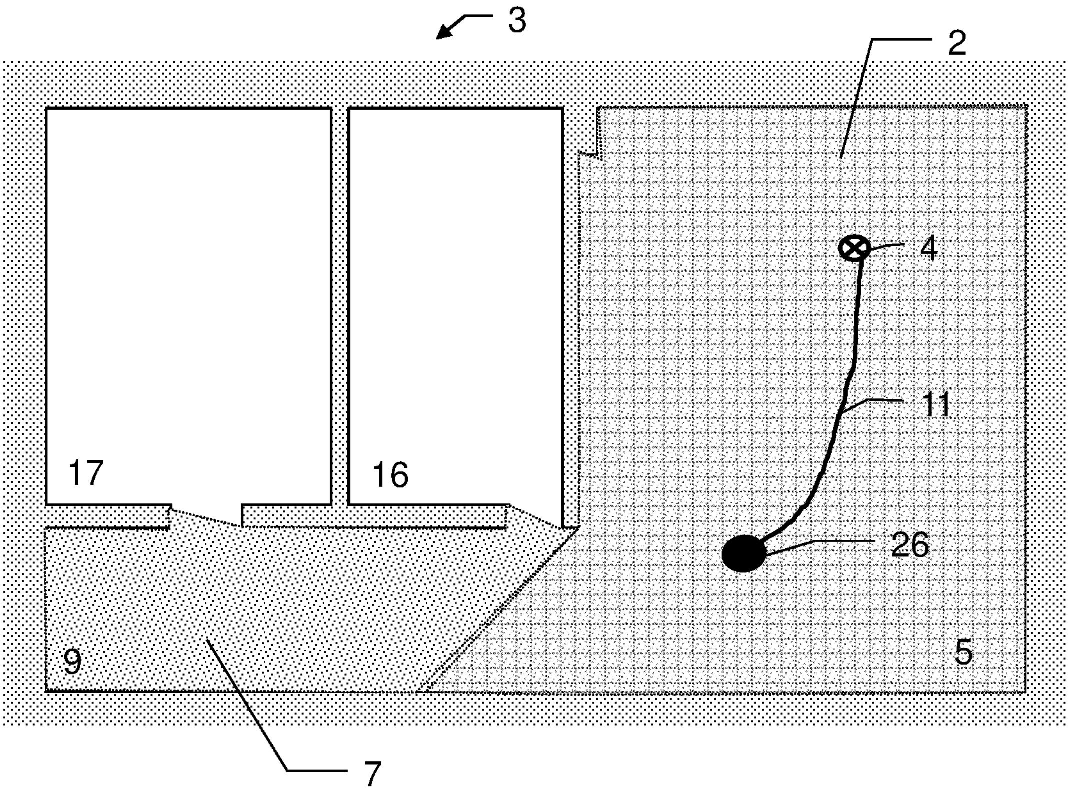
FIG. 7: visualization of the second measurement region covered by the second measurement position on a floor plan.

FIG. 7 depicts a visualization of the second measurement region 7 (dotted portion) covered by the second deployment on position 26 on a floor plan. The first and second measurement surroundings 5, 9 are understood to be a surroundings region (task region) which should be surveyed, i.e., scanned, for example. In the example, this is the already scanned first measurement region 2 (chequered portion) and the access region 9 to the two smaller rooms 16, 17. Thus, the first measurement region 2 can be considered to be a partial region or subset of the task region. In the example, both the first and second measurement surroundings 5, 9 (the large room 5 and the access region 9) are optically captured by the VIS from the position 26. Then the captured first and second measurement surroundings 5, 9 are searched for corresponding first and second object features 24 visible in a certain number and quality in the first and second measurement surroundings 5, 9. If this this certain number and quality of corresponding features 24 is visible a registration of the first and second point cloud is possible. Thus, the entire task region can be measured without a gap, as shown in FIG. 7.

Figure 8:
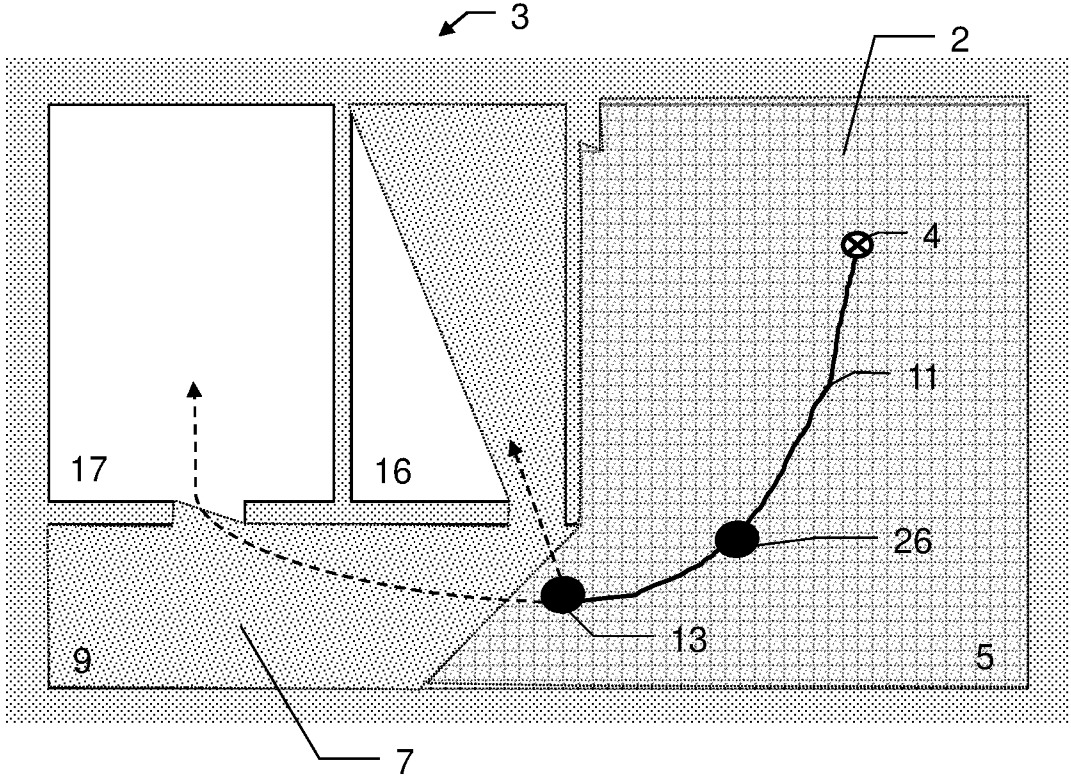
FIG. 8: visualization of further thinkable deployments for a complete detection of the measurement surroundings.

However, as depicted in FIG. 8, the user 10 and the device 1 continue their movement 11 and reach position/deployment 13. A further optical capture 12 of measurement surroundings 3 is implemented during the deployment change 11 and from this position 13. Already on the path to this position 13, image capturing, feature detection, feature tracking and calculation of the path 11 are performed. The optical capture 12 and comparison of the captured first and second measurement surroundings 5, 9 based on the corresponding first and second object features 24, shows that furthermore a registration of the first and second point cloud is possible and thus a gap-free measurement of the task region (5 plus 9) is possible. From position 13, a part of the room 16 can also be surveyed. Consequently, a larger region can be covered from position 13 with the second survey than from position 26. Consequently, position 13 is suggested to the user 10 as a more optimal position for the second deployment 8 compared to position 26 on the basis of the specified optimization criterion having as few deployments as possible. However, in order to cover the measurement surroundings 3 completely, it is necessary to enter the rooms 16 and 17 (dashed arrows).

Figure 9:
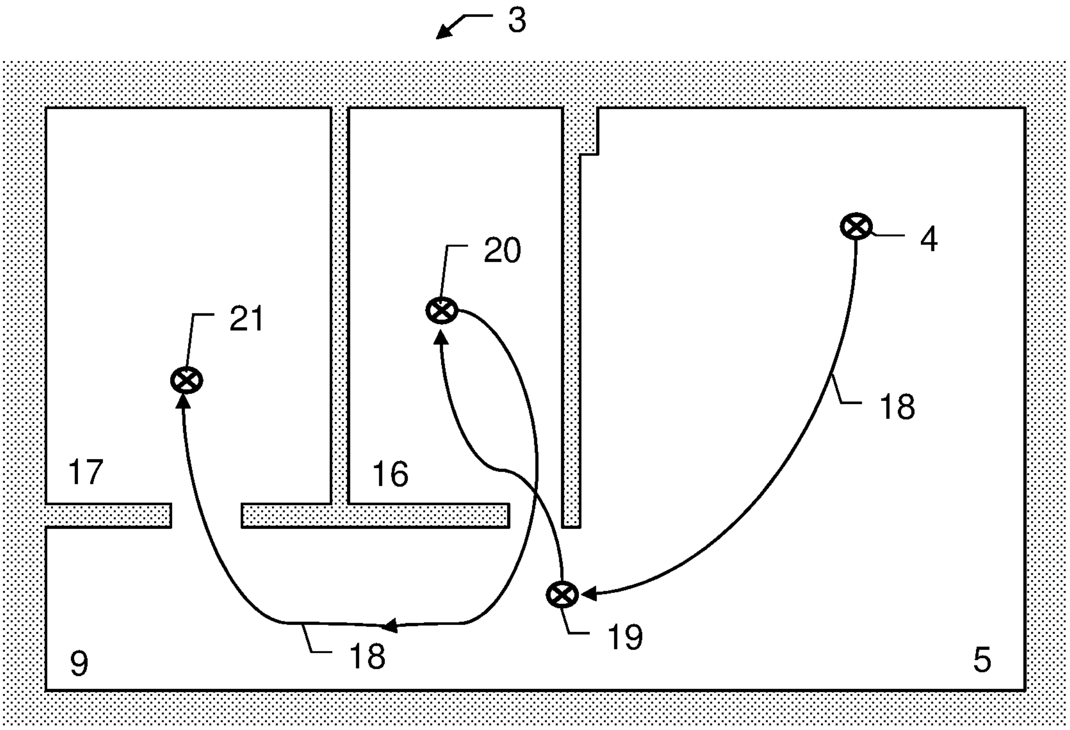
FIG. 9: visualization of one reference trajectory downloaded from the cloud or already saved on the device.

FIG. 9 depicts a visualization of one reference trajectory 18 downloaded from the cloud or already saved on the device. The data of reference trajectories 18, which are derived from previous scanning campaigns and/or are pre-calculated are downloaded from the cloud and/or are already saved on the mobile measuring device 1. Then the user 10 selects at least one of the reference trajectories 18. The user 10 is moving from the first deployment 4 in the measurement surroundings 3 in order to measure it completely. For example, the selected reference trajectory 18 is compared with the movement 11 of the mobile measuring device 1. If the user 10 deviates from the reference trajectory 18 during the movement 11 or deploys the device at an unsuitable position, the user 10 is informed via an user output 23, for example an acoustic or vibration signal, and is directed back to the reference trajectory 18. By way of example, the user 10 can also see the map of the measurement surroundings 3 on a tablet, with the reference trajectory 18, his own trajectory 11 and the optimal deployments 4, 19, 20, 21 marked on the map. In this way, the user 10 is supported by navigating and can quickly find his way through the measurement surroundings 3, follow the reference trajectory 18 and thus carry out the survey with optimal deployments and direct paths in a time-saving manner.

Besides determining a minimum number of deployments or the optimal deployments, another application can be to guide the user to a specific location to scan (again) at a specific resolution and/or to capture images. An operator in the office can immediately analyze the data being streamed live to the cloud. Users on site can be guided directly to a position by using a target trajectory transmitted from the cloud to the measuring device.

Figure 10:
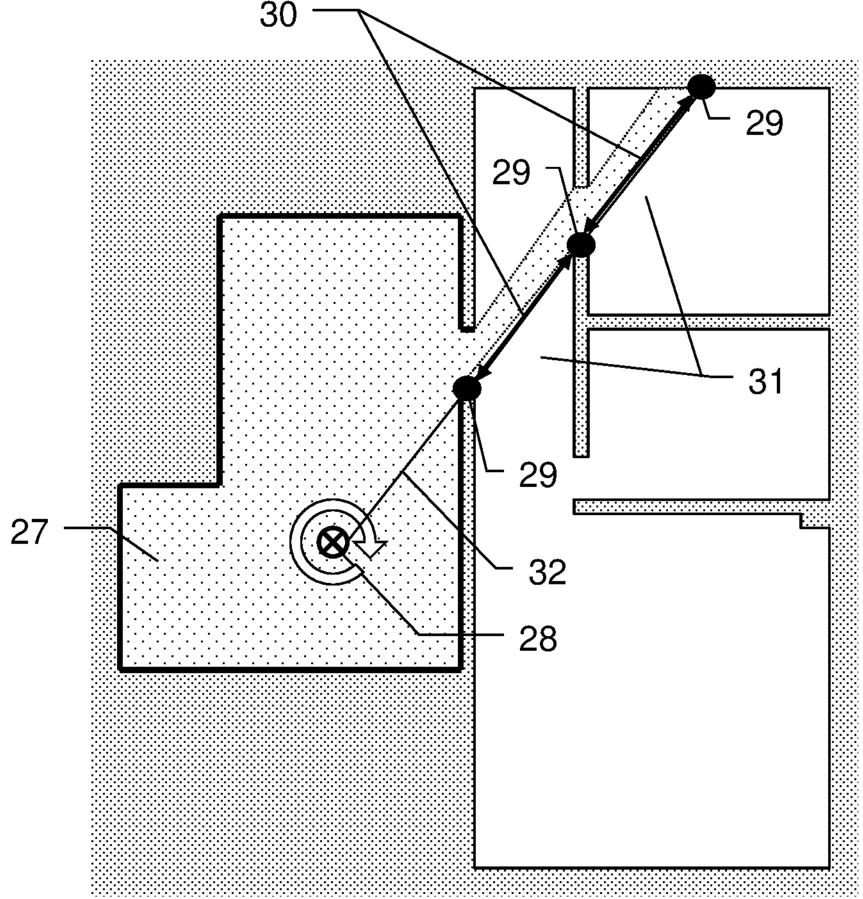
FIG. 10: visualization of the gap detection on a floor plan.

FIG. 10 depicts a visualization of the gap detection on a floor plan. The scan coverage 27 from the scanning position 28 is marked as a dotted area. White areas are not yet covered. For gap detection edges/object features are detected as areas where adjacent scan points/object features 29 have highly differing distances 30 (the expression "adjacent" means that the optically captured scan points/object features 29 are located on a line 32 starting from scanning position 28 over the optically captured scan point/object feature closest to the device, the distance between the scan points/object features 29 may vary). The larger the distance difference 30, the larger the potential gap 31. The distance between object features can be estimated by using machine learning, in particular by a convolutional neural network. This estimation is refined, and the error is reduced by training the network with consecutive images. For example, a pattern of three points of known distance can be used to calculate the initial distance, wherein the camera must be perpendicular to the points. Subsequently, the camera is placed at a known distance from an object (centered in the image). Then, pixels of the detected face are counted; finally, with these data, a relationship is established to calculate the distance when detecting the same object in future images from different positions of the camera.

The distance of the object features is known exactly if there is also a point cloud in which the object features extracted from the images are available as scan points (for object features tracked by VIS the distance to the device and between the object features is always known). The camera(s) and the measuring system are calibrated to each other, which allows an unambiguous matching. This data can be used to improve the convolutional neural network.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A method for ascertaining a suitable deployment of a mobile measuring device within measurement surroundings, wherein:

a first measurement region is surveyed from a first deployment, based on this survey, the number of measuring points in the first measurement region is determined as the first point cloud, first measurement surroundings containing first object features are automatically optically captured at the first deployment and tracked using a visual inertial system (VIS), the mobile measuring device is moved away from the first deployment for the purposes of changing the deployment to a second deployment and survey a second measurement region from this second deployment, wherein based on this second survey, the number of measuring points in the second measurement region is determined as a second point cloud, second measurement surroundings containing second object features are automatically optically captured and tracked using the VIS within the scope of changing the deployment, the first and second measurement surroundings are compared, wherein the comparison is based on searching for corresponding first and second object features visible in a certain number and quality in the first and second measurement surroundings, wherein this certain number and quality of corresponding features is a criterion that a registration of the first and second point cloud is possible, the comparison of the first and second measurement surroundings is carried out during the deployment change, the user is informed about the result of the comparison during the deployment change, wherein the user is informed as:

a point cloud registration of the first and the second point cloud is possible, and/or a point cloud registration of the first and the second point cloud is impossible;

establishing existence of coverage gaps between the first point cloud and second point cloud; and providing the coverage gaps to the user as output, wherein the output is selected from the group of an acoustic signal, a vibrational signal, and/or an optical signal.

2. The method according to claim 1, wherein the user is informed about the result of the comparison during deployment change, wherein the user is informed as:

there are still first and second object features visible in a certain number and quality in the first and second measurement surroundings, and/or there are no longer first and second object features visible in a certain number and quality in the first and second measurement surroundings.

3. The method according to claim 1, wherein a position of the mobile measuring device adopted within the scope of the movement is checked for the suitability thereof for a deployment, in particular for a second and next deployment, based on an automatic analysis of the possibility of the point cloud registration of the first and the second point cloud.

4. The method according to claim 3, wherein a user warning is output within the scope of the method as soon as a position is determined as being unsuitable for a deployment.

5. The method according to claim 1, wherein a processing is implemented continuously, wherein in the scope of the processing:

the optical capture of the first and second measurement surroundings containing first and second object features is implemented continuously, and/or the captured first and second object features are updated continuously on the basis of the continuously captured first and second measurement surroundings, and/or the comparison of first and second measurement surroundings is implemented continuously, and/or the comparison of captured first and second object features is implemented continuously, and/or the automatic analysis of the possibility of the point cloud registration of the first and the second point cloud is implemented continuously, and/or the check for the suitability for a deployment is implemented continuously.

6. The method according to claim 1, wherein, within the scope of the method and on the basis of a result of the check:

a suitable and/or unsuitable location and/or location zone for surveying the second measurement region, and/or a visibility of the first and second object features in a certain number and quality in the first and second measurement surroundings, and/or the optical signal is a visualization on a graphical map of the measurement surroundings.

7. The method according to claim 1, wherein ascertaining a suitable position for an optimal deployment is further implemented on the basis of at least one specified optimization criterion.

8. The method according to claim 7, wherein the optimization criterion relates to:

gap-free joining of the second measurement region to the first measurement region with a defined overlap with said first measurement region and/or surveying the first measurement region and the second measurement region with as few deployments as possible and/or as little time expenditure as possible and/or the shortest possible path between the deployments and/or the greatest possible geometric accuracy of the deployments with respect to one another, and/or as equidistant deployments as possible, first and second point clouds with point density as homogeneous as possible.

9. The method according to claim 1, wherein the data:

of the optical capture of the first and second measurement surroundings, of the comparison of the optical captured first and second measurement surroundings, of the first and second point cloud, of the analysis of the first and second point cloud, of the check for the deployment suitability, of suitable and/or unsuitable locations and/or location zones for surveying the measurement regions, are uploaded to a cloud in real time and are downloadable from the cloud at any time after their upload.

10. The method according to claim 9, wherein the data are uploaded to and downloaded from the cloud simultaneously from multiple mobile measuring devices, wherein these multiple measuring devices are used and coordinated for the surveying of the measurement surroundings.

11. The method according to claim 1, wherein data of reference trajectories which are derived from previous scanning campaigns and/or which are precalculated are downloaded from the cloud and/or are already saved on the mobile measuring device, wherein the user and/or the mobile measuring device selects at least one of the reference trajectories, wherein the selected reference trajectory is compared with the movement of the mobile measuring device, wherein said comparison assists the user navigating through the measurement surroundings by providing the user a user output, in particular by means of an acoustic signal, and/or a vibrational signal, and/or an optical signal, in particular a visualization on a graphical map of the measurement surroundings when the user leaves the reference trajectory.

12. The method according to claim 11, wherein the data are uploaded to and downloaded from the cloud simultaneously from multiple mobile measuring devices, wherein these multiple measuring devices are used and coordinated for the surveying of the measurement surroundings.

13. The method according to claim 1, wherein:

the distance between the deployments, the distances between the mobile measuring device and measured object features in the measurement surroundings, the distances between measured object features in the measurement surroundings are determined by machine learning, in particular by a convolutional neural network, wherein the distances between the mobile measuring device and the measured object features in the measurement surroundings and/or the distances between measured object features in the measurement surroundings are a criterion that a point cloud registration of the first and the second point cloud is possible, in particular that large distances between the mobile measuring device and the measured object features and/or large distances between measured object features indicate coverage gaps in the first and second point cloud.

14. The method according to claim 1, wherein the number and quality of corresponding first and second object features is used to optimize the deployment, wherein:

an increased number of corresponding object features facilitates the registration of the first and second point clouds via a feature-based method for coarse registration, the coarse registration provides sufficiently accurate initial values for fine registration by means of an algorithm, in particular an iterative closest point algorithm (ICP), the quality of the optical capture of corresponding first and second object features is determined by counting and matching pixels in the images of the first and second measurement environments that correspond to first and second object features, wherein a high match in the number of pixels corresponds to a high quality of the optical capture of corresponding first and second object features, with an increased quality of corresponding first and second object features, a fine registration by means of an algorithm, in particular an iterative closest point algorithm (ICP), is facilitated.

15. A computer program product having program code stored on a non-transitory machine-readable medium, configured as a control and evaluation unit, of a mobile measuring device, for carrying out at least the following steps of a method:

optically capturing at the first deployment and tracking first measurement surroundings containing first object features using a visual inertial system (VIS), determining the number of measuring points in the first measurement region as the first point cloud, surveying a second measurement region from a second deployment, wherein based on this second survey the number of measuring points in the second measurement region is determined as a second point cloud, optically capturing and tracking second measurement surroundings containing second object features using a VIS within the scope of changing the deployment of the mobile measuring device, comparison of the first and the second measurement surroundings, wherein the comparison is based on searching for corresponding first and second object features visible in a certain number and quality in the first and second measurement surroundings, wherein this certain number and quality of corresponding features is a criterion that a registration of the first and second point cloud is possible, carrying out the comparison of the first and second measurement surroundings during the deployment change, informing the user about the result of the comparison during the deployment change, wherein the user is informed as:

there is a point cloud registration of the first and the second point cloud possible, and/or there is a point cloud registration of the first and the second point cloud impossible;

establishing existence of coverage gaps between the first point cloud and second point cloud; and providing the coverage gaps to the user as output, wherein the output is selected from the group of an acoustic signal, a vibrational signal, and/or an optical signal.

16. A mobile measuring device, comprising:

one or more optical units embodied as visual inertial systems (VIS) to capture measurement surroundings containing object features and a deployment checking functionality, wherein the following is implemented automatically when carrying out the deployment checking functionality:

optically capturing at the first deployment and tracking first measurement surroundings containing first object features by means of the one or more optical units using the VIS, determining the number of measuring points in the first measurement region as the first point cloud, surveying a second measurement region from a second deployment, wherein based on this second survey the number of measuring points in the second measurement region is determined as a second point cloud, optically capturing and tracking second measurement surroundings containing second object features using the VIS within the scope of changing the deployment of the mobile measuring device, comparison of the first and the second measurement surroundings, wherein the comparison is based on searching for corresponding first and second object features visible in a certain number and quality in the first and second measurement surroundings, wherein this certain number and quality of corresponding features is a criterion that a registration of the first and second point cloud is possible, carrying out the comparison of the first and second measurement surroundings during the deployment change, informing the user about the result of the comparison during the deployment change, wherein the user is informed as there is a point cloud registration of the first and the second point cloud possible, and/or there is a point cloud registration of the first and the second point cloud impossible;

establishing existence of coverage gaps between the first point cloud and second point cloud; and providing the coverage gaps to the user as output, wherein the output is selected from the group of an acoustic signal, a vibrational signal, and/or an optical signal.

* * * * *